April 13, 1954 K. K. CLARKE 2,675,430
SIGNAL GENERATING AND SWITCHING CIRCUIT FOR RECORDING DEVICES
Filed March 14, 1952
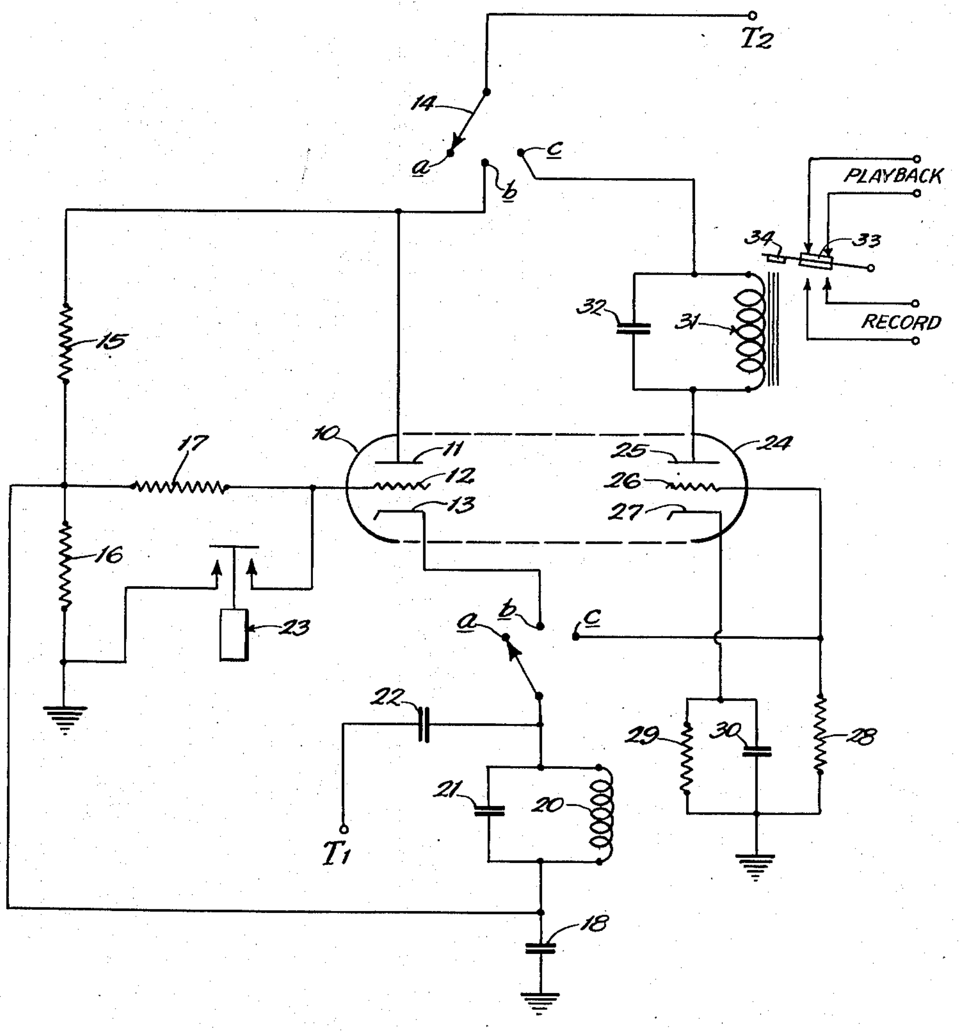
INVENTOR:
Kenneth K. Clarke,
BY
Dawson & Ooms,
ATTORNEYS.

Patented Apr. 13, 1954 2,675,430

UNITED STATES PATENT OFFICE 2,675,430

SIGNAL GENERATING AND SWITCHING CIRCUIT FOR RECORDING DEVICES

Kenneth K. Clarke, Chromepet, Madras, India

Application March 14, 1952, Serial No. 276,713

13 Claims. (Cl. 179—100.2)

This invention relates to a signal generating and switching circuit for recording devices and has particular utility with recorders wherein recorded intelligence may be removed or erased from the record medium, as for example, magnetic tape or wire recorders, and where the recorder may be selectively conditioned to record or to play back the recorded intelligence.

Where portions of a recording have been incorrectly recorded on an erasable medium or for other reasons, portions of the recorded intelligence have been erased or removed and it is desired to re-record the erased portions, it is exceedingly difficult to properly and accurately synchronize the new intelligence with the previously recorded material to produce a perfect and flawless continuous recording. If the recording device is first placed in record condition and permitted to run, there is no way for the person or group making the recording to know the proper moment at which the re-recording should start and when it should stop, and it is virtually impossible to produce a good recording.

If the recorder is first placed in record condition and is then turned on at the exact point where re-recording should start, the person recording cannot properly synchronize the new intelligence with that which has gone before, and the problem of terminating the new material at the proper instant still exists.

Manual or mechanical switching or change-over arrangements whereby the recording is played back to permit the person or group, etc. recording to synchronize with the recorded intelligence and when the point is reached at which the re-recording is to start the recorder is switched to record condition, are not satisfactory because the time delays involved in overcoming the inertia of mechanical devices, etc. result in appreciable distortion. These problems exist whether the recorded material or intelligence is a speech, a vocal selection, an orchestration, etc.

It is then an object of this invention to provide a device that will overcome the above problems and that will permit re-recording of record portions accurately timed and properly synchronized with the previously recorded intelligence.

Another object of the invention is to provide a switching or change-over arrangement permitting the recorder to be rapidly—almost instantaneously—and automatically changed from play back to record condition when the position is reached at which re-recording is to begin and to return the recorder to play back condition when the position is reached at which re-recording is to cease, with the result that the recorded material may be properly synchronized with the previously recorded material and a perfect recording will be produced.

A further object is to provide a device permitting the recording to medium to be marked with a non-distorting signal at the exact points or positions where re-recordings are to begin and terminate to the end that these marker signals will be utilized to change the recorder from one condition to another automatically.

Still another object is to provide means responsive to the recorded marker signals to automatically change the recorder from one state or condition to another, and where a plurality of marker signals are recorded on the record medium, the first and thereafter alternate signals will change the recorder from play back to record condition while the second and thereafter alternate signals will return the recorder to play back condition.

Still a further object is to provide a pulse signal of relative short duration and of relatively high frequency to mark the record medium.

Yet another object is to provide a switching means responsive to recorded marker pulses to effect a change of recorder condition without the use of switching motors and other slow response devices.

Another object is to provide electrical means to accomplish the above stated objects and to provide a switching arrangement for selectively rendering the marker circuit or the change-over circuit operative, or to make both inoperative.

Other objects and advantages will appear as the specification proceeds.

My invention can best be understood by referring to a single embodiment of the invention as illustrated by the accompanying drawing which is a schematic circuit diagram.

In general, my invention consists of means for generating or producing marker signals at desired instants and for applying the signals to the recording mechanism or recording head of a recorder so that they will be impressed or recorded on the record medium. In addition, means are included that can be rendered responsive to the recorded marker signals when the recorder is playing back the record to change the recorder from one state or condition to another; that is, from play back to record condition or the reverse of this. Means are also included to selectively place the marker signal generating means in operation, the marker signal responsive means in operation, or to make both inoperative so that they will have no effect on the normal recorder functioning.

The signal generating means may consist of any device or electric circuit arrangement that will produce marker signals of desired duration and frequency. Both duration and frequency of the marker signals and also the amplitude required will depend largely upon the type of recorder with which the generating means will be used, and elements may be varied to fit the needs of particular applications.

It has been found that the circuit embodiment shown in the drawing for purposes of illustration produces excellent results and provides considerable flexibility since it may be readily modified. The marker signal generating portion of the circuit is essentially an oscillator and includes an electron discharge tube 10 having an anode 11, control grid 12, and cathode 13. The anode 11 is connected through a three position switch 14 to a power source (not shown) suitable for supplying the power requirements of the tube 10. In the position illustrated, the switch 14 is on contact *a* which is the off position, and the anode 11 is thereby disconnected from the power source.

The anode 11 is connected to ground through resistors 15 and 16 which form a voltage divider. Either or both of the resistors 15 and 16 can be replaced with variable or adjustable elements. The grid 12 is connected to the mid-point of the voltage divider 15—16 through a resistor 17 and then to ground through a capacitor 18 which parallels the resistor 16. Normally, the grid 12 is above ground potential.

The cathode 13 is connected through a three position switch 19, which is ganged with the switch 14, to a coil 20 in parallel with a capacitor 21 and together therewith form a tuned or resonant circuit. Here again either or both of these elements may be made variable. The switch side of the tuned circuit 20—21 is coupled to the recording mechanism or recording head (not shown) of a recorder through a coupling capacitor 22. The opposite side of the tuned circuit is connected to the common terminal of the voltage divider resistors 15 and 16. The switch 19 is shown in position *a* or off position, and the cathode 13 is thereby disconnected from the resonant circuit 20—21.

A switch 23 is connected between ground and the grid 12 so that the grid is directly grounded when the switch 23 is closed. The switch illustrated is of the dashpot type that is normally open and may be manually closed by depressing the contact button. When the contact button is released, the switch opens slowly because of the dashpot arrangement so that the grid remains grounded for a relatively short interval after the contact button has been released.

The purpose of this arrangement is to avoid instantaneous grounding and ungrounding of the grid, and any arrangement, whether mechanical or otherwise, to accomplish this result would be satisfactory. Since the period of grounding is relatively short, in most applications an ordinary press-release switch would be sufficient.

To place the marker signal circuit in operation, the ganged switches 14 and 19 are turned to position *b* which completes the circuit from the anode 11 to the power supply and places the tuned circuit 20—21 in circuit with the cathode 13. The tube 10 begins to conduct current and remains conductive until the contact button of the switch 23 is depressed. This grounds the grid 12, the tube is cut off, and current flow through the tube is terminated. However, the current flowing through the coil 20 continues and oscillations are set up in the resonant circuit 20—21 at a frequency determined in accordance with the formula $$\frac{1}{2\pi}\sqrt{LC}$$

where L is the inductance of the coil 20 and C is the capacitance of the circuit. The oscillations produced are coupled through the capacitors 18 and 22 to the recording mechanism or recording head and are recorded on the record medium as the marker signals. The oscillations cease when the dashpot releases the switch and the grid 12 is thereby ungrounded. The marking procedures may be repeated as often as desired.

The technical specifications of the particular recorders with which the marker circuit is used will largely determine the required signal frequency, pulse amplitude, and pulse duration. The frequency of the oscillations or mark pulse signals may be varied by changing the values of the resonant circuit elements 20 and 21. The amplitude of the signal may be varied by appropriate changes in the voltage divider 15—16. The length of the pulse signal may be altered by changing the dashpot switch 23 or by the addition of a damping resistor in the tuned circuit 20—21. It is preferred, however, that the frequency be above the normal band or recorded frequencies and below that of the high frequency bias supply. Generally this will be within the range of 10,000 to 20,000 cycles per second.

Various arrangements are possible to furnish the means responsive to the recorded marker signals to change the recorder from one operative state to the other. The remainder of the circuit illustrated in the drawing is a single embodiment that accomplishes this result. Generally, this circuit includes a detector, amplifier and relay combination.

An electron discharge tube 24 having an anode 25, grid 26, and cathode 27 amplifies the received marker signals. The tube 24 may be a second half of the tube 10; that is, together they may be a duo-triode tube or they may be separate tubes.

The grid 26 is connected to ground through a resistor 28. The cathode 27 is grounded through a resistor 29 which is in parallel with a capacitor 30. The resistors 28 and 29 and the capacitor 30 form a grid bias circuit that holds the tube 24 normally near cut-off.

The grid 26 is also directly connected through contact *c* of the switch 19 to the resonant circuit 20—21. Thus, when the ganged switches 14 and 19 are in position *c*, the grid 26 is in circuit with the resonant circuit 20—21 and connected to the recording head of the recorder through the coupling capacitor 22.

The anode 25 is connected through a relay 31 which is in parallel with a capacitor 32 to contact *c* of the switch 14, and then to the power supply. When the switch 14 is in position *c*, the plate 25 is thereby supplied power.

The relay 31 is preferably a locking type relay; that is, when once fired or actuated it remains in closed position until the plate circuit is disconnected from the power source, or until a second flow of current flows through the relay coil which will cause it to return to its normally open position. Any device, either mechanical or electrical, that will function in a like manner is an acceptable substitute for the relay 31. Any contact arrangement that will permit the recorder to be switched from one condition to another by the opening and closing of the relay 31 may be used. For example, the relay 31 may be provided with a contact 33 that completes the phonograph play back circuit when the relay is normally in relaxed or deactuated condition. A contact 34 may be used to complete or close the record circuit of the recorder when the relay is actuated. The play back circuit, completed by the contact 33, will be broken when the relay is closed or actuated.

To place the signal actuated circuit in operation, the ganged switches 14 and 19 are turned to contact *c*, and the recorder is placed in play back condition. The tube 24 is normally biased nearly to cut-off and only a small current flows through the relay circuit. When the position is reached on the recording having marker signals recorded thereon, these signals are picked up by the play back head and are coupled through the capacitor 22 to the tuned circuit 20—21. These pulse signals drive the grid 26, which is coupled to the tuned circuit 20—21 through the contact *c* of the switch 19, positive with respect to the cathode 27. The tube 24 becomes conductive and more current flows in the circuit of the plate 25.

As plate current flows, the capacitor 32 is charged and the relay 31 is actuated, thus breaking the play back circuit of the recorder and completing the record circuit. The relay 31 remains in actuated position after the receipt of marker signals is discontinued and plate current ceases to flow. The relay is released if the circuit is turned off or the switches 14 and 19 are otherwise turned from contact *c*. Upon receipt of a second group of marker signals, the tube 24 again becomes conductive and the current flowing through the plate circuit causes relay 31 to return to its normally deactuated condition, breaking the record circuit and completing the play back circuit.

The parallel capacitance 32, and the resistance and inductance of the relay winding may be arranged to fire after any desired number of signal marker cycles are received. By way of example, the relay may be arranged to fire on the third or fourth cycle of the marker signal. This will introduce a small additional time delay in the changing of the recorder from one condition to another. However, the total time delay will still be very short when compared with the time of a normal speech syllable (the total delay would be about 5-10 milli-seconds). The additional delay will be effective to prevent the relay from being fired or actuated by spurious responses.

A filter, not shown, may be inserted between T1 and the recording head to prevent the device from effecting the normal performance of the head for audio frequencies.

The power requirements of the signal marker and signal actuating circuits is small, and it is contemplated that these circuits may be connected through the switch 14 to the power supply of the recorder with which the circuits are being used. The power supply of most recorders will provide a suitable source of power, but if for any reason a separate power supply is desired, it may be readily connected through the switch 14.

It is to be understood that the tubes 10 and 24 may be replaced with solid state devices such as germanium cells.

*Operation*

After the circuits have been connected as indicated to a recorder, the circuits are operated by turning the switches 14 and 19 to contact *b*. In this position, the marker circuit is connected to the power supply through the switch 14 and the tuned circuit 20—21 is placed in the cathode circuit of the tube 10 through the switch 19. The recorder is placed in play back condition and the operator may hear the recorded intelligence.

When a point on the recording is reached at which the operator desires to remove or replace the recorded intelligence, he pushes the contact button of the switch 23 and immediately releases it. The oscillations thereby produced in the tuned circuit 20—21 as previously described are recorded on the record medium. When the position on the record is reached at which the operator wishes the erasing to terminate, he again pushes the contact button of the switch 23 and a second group of oscillations or marker signal is recorded on the record medium.

If the erasing is to continue to the end of the recording the marker switch 23 need not be depressed a second time. If there are separated portions of the record that are to be erased, the operator simply repeats the procedure and depresses the marker switch 23 at the positions where erasing is to start and again at the position where the erasing is to terminate.

After the recording has been marked as required, the ganged switches 14 and 19 are turned to contact *c*. This disconnects the tube 10 from the power supply and connects the power supply with the tube 24. Also, the tuned circuit 20—21 is removed from the cathode circuit of the tube 10 and placed in the grid circuit of the tube 24. The operator then plays back the record. When the point on the record medium is reached containing the first recorded marker signals, the signals are received and amplified by the tube 24 and the relay 31 is fired. The play back circuit of the recorder is thereby broken and the record circuit completed. This takes place almost instantaneously. The recorder is now in condition to re-record on the erased portions of the record. When the position on the record is reached containing the second group of oscillations or the marker signal, the relay 31 is deactuated as previously described and the recorder is automatically and instantaneously returned to play back condition. If a third marker signal is received, the procedure is repeated and the recorder is returned to record condition. Thus, it is seen that the first and thereafter alternate recorded marker signals change the recorder from play back to record condition, and the second and thereafter alternate signals are effective to change the recorder from record to play back condition.

Since the change from one condition to another is automatic, the individual or group recording has only to concern itself with synchronizing the material or intelligence to be re-recorded with the material previously recorded. The matter of synchronization is considerably simplified since the recorder is initially in play back condition. The persons recording can therefore follow along with the previously recorded material so that perfect synchronization is obtained, and the re-recorded material follows perfectly from that initially on the record. Since the recorder is automatically returned to play back condition, the re-recording is properly terminated at the exact point.

The marker signals are very short in duration and are preferably of a frequency slightly above the normal recording frequencies. Therefore, the signals themselves cause very little distortion and remain unheard when the recording is played back. Because of this, it is possible to superimpose new material on material previously recorded at desired points on the recorded medium. For example, a person having recorded a vocal selection might wish to record a harmony part on certain portions of the record. By use of this invention, he simply records the marker signal at the position where the harmony part is to start and again at the point where it is to terminate. Switches 14 and 19 are then turned to contact c or operate position and the record is then played back. The operator may sing along with the record so as to synchronize with the material previously recorded, and when the position is reached at which the harmony part is to be superimposed, the recorder is automatically switched to record condition in response to the recorded marker signals and the harmony part is accurately recorded. The harmony recording ceases when the position is reached at which the second marker signal has been recorded.

It is contemplated than my invention may be incorporated in suitable recording devices. To this end, the simplicity of the circuits are a great advantage. Only three connections need be made to include the circuits of my invention in a recorder. The tuned circuit 20—21 is connected through the capacitor 22 and terminal T1 to the recording and play back head of the recorder. The switch 14 is connected through terminal T2 to the anode power supply of the recorder, and the relay 31 is connected so as to complete the play back circuit when it is in deactuated condition and to complete the record circuit when actuated. If discharge tubes are used, then suitable connections must be made to complete the filament circuit.

If desired, the circuits of my invention may be built as a separate unit to be attached to recorders. As a separate unit, it may or it may not have its own power supply as desired. A signal light may be included so that the operator knows when the recorder is changed to record condition. However, this is usually not necessary since most recorders have such a signal light.

The simplicity of the arrangement makes it very economical to build and this same simplicity results in a rugged arrangement that produces accurate signal generations and response to recorded marker signals.

While in the foregoing specification I have set forth a specific structure and circuit arrangement in considerable detail for the purpose of illustrating one embodiment of my invention, it will be understood that such details of structure and circuitry may be varied widely by those skilled in the art without departing from the spirit of my invention.

I claim:

1. In a magnetic recorder adapted to be placed selectively in record or play back condition and wherein recorded intelligence may be erased from the magnetic record and replaced with new intelligence, a marker signal generating and recorder switching circuit, including a resonant circuit coupled to the record head of the recorder, means selectively arrangeable with said resonant circuit for establishing oscillations therein of relatively short duration and at predetermined instants when said recorder is receptive to the recordation of signals on the record, whereby the oscillations established within said resonant circuit are recorded as relatively short marker signals at selected points on the record medium, further means including a relay selectively arrangeable with said resonant circuit for receiving recorded marker signals and for changing the recorder from one condition to another upon receipt of a marker signal, and a switch for selectively arranging said resonant circuit with said first-mentioned means or with said second-mentioned means, whereby said marker and switching circuit may be selectively conditioned to generate marker signals or to receive previously recorded marker signals and change the recorder from one condition to another in response thereto.

2. The circuit of claim 1 in which the relay is a holding type operable to move a switch from one position to another in response to a current pulse and to hold the switch in either position after the current pulse has terminated and until a subsequent pulse is received, whereby receipt of the first recorded marker signal actuates said relay to change the recorder from one condition to another and is released by a second marker signal to return the recorder to the initial condition.

3. In a recording device adapted to be placed selectively in record or play back condition and wherein recorded intelligence may be erased from the record medium to condition it for recording other intelligence, a pulse producing and switching circuit, comprising selectively operable electric means for producing marker pulses and for applying the produced pulses to the recording head of the recorder for recording on the record medium, manual means for actuating said electric means to control the production of marker pulses, whereby marker pulses may be recorded at desired points on the record medium, selectively operable electric means adapted to receive the recorded marker pulses, means operatively arranged with said last-mentioned electric means and actuated by the first and thereafter alternate received marker pulses when said recorder is in play back condition to automatically change the recorder from play back to record condition, and further actuated upon receipt of a second and thereafter alternate marker pulses to automatically return the recorder to play back condition, and manual means for selectively placing said circuit in pulse generating, pulse receiving, or inoperative states.

4. In a recording device adapted to be placed selectively in record or play back condition and wherein recorded intelligence may be erased from the record medium to condition it for recording other intelligence, the combination comprising an oscillatory circuit coupled to the recording head of the recorder and adapted when in operation to produce marker signals of relatively short duration for recording on the record medium, manually operable mechanical means for actuating said oscillator at desired instants, a circuit tuned to the oscillator frequency and adapted to receive marker signals recorded on said record medium, electrical means arranged with said last-mentioned circuit and actuated by the first and thereafter alternate signals received by the circuit when the recorder is initially in play back condition to automatically change the recorder from play back to record condition, and further actuated by the second and thereafter alternate signals received by the circuit to change the recorder from record to play back condition, and switch means to selectively render the oscillatory circuit operative, the receiver circuit operative, or both inoperative.

5. In a recording device adapted to be placed selectively in record or play back condition and wherein recorded intelligence may be erased from the record medium to condition it for recording other intelligence, an oscillatory circuit for generating a signal having a frequency above that of the normal recording range coupled to the recording head, whereby signals generated by the oscillator are recorded on the record medium when said device is in a condition receptive to the recordation of signals on the record medium, means for actuating said oscillator at selected times and for short periods to produce pulse signals of relatively short duration, a receiver circuit operatively arranged with said device and tuned to the frequency of said oscillator and adapted to receive the recorded oscillator signals when the recorder is playing back the record, electrical means arranged with said receiver circuit and said device and actuated by the first and thereafter every second pulse signal received by said receiver circuit to automatically change the recorder from play back to record condition, and further actuated by the second and thereafter alternate pulse signals received by said receiver circuit to change the recorder from record to play back condition, and manual means to selectively render the oscillator circuit operative, the receiver circuit operative, or both inoperative.

6. A signal generating and switching circuit for use with recording devices wherein the recorder may be placed selectively in record or play back condition, comprising means for producing marker signals and for applying the signals to the recording head of a recorder for recording on the record medium, manually operable means for controlling the production of marker signals, means operatively arranged with said device and actuated by the first recorded marker signal when the recorder is playing back the record to change the recorder from play back to record condition, and further actuated by a subsequent marker signal to return the recorder to play back condition, and manually operable means for selectively placing said circuit in signal generating, signal actuated, or inoperative states.

7. The circuit of claim 6 in which the marker signals are of a frequency at least as high as the upper range of recording frequencies, and are also of relatively short duration.

8. A signal producing and switching circuit for use with recording devices wherein the recorder may be placed selectively in record or play back condition, comprising means for selectively producing a marker signal and adapted to be arranged with said recorder for applying the signal to the recording head thereof for recording at desired positions on the record medium, and means adapted to be arranged with said recorder for actuation by a prior recorded signal to change the recorder from one condition to another.

9. The circuit of claim 8 in which the marker signal is of a frequency at least as high as the upper range of recording frequencies.

10. The circuit of claim 9 in which the marker signal is of relatively short duration.

11. In combination with recording and play back apparatus of the type wherein the recorded intelligence is imposed on an erasable medium and erasing means are provided for selectively removing recorded intelligence from the medium, means for producing marker signals, means operatively arranged with said apparatus for recording marker signals on said medium at the beginning of an erasure therefrom and also at the termination of the erasure, and means responsive to a marker signal recorded on said medium at the beginning of an erasure and when said apparatus is in play back condition for changing the apparatus to record condition, said last-mentioned means also being operative in response to a marker signal recorded on said medium at the termination of an erasure and when said apparatus has been placed in record condition in response to a prior marker signal to change said apparatus from record to play back condition.

12. In combination with recording and play back apparatus of the type wherein the recorded intelligence is imposed on an erasable medium and erasing means are provided for selectively removing recorded intelligence from the medium, selectively operable means for producing a plurality of marker signals of relatively short duration, means operatively arranged with said apparatus and with said last-mentioned means for recording marker signals on said medium at the beginning of an erasure therefrom and again at the termination of the erasure, and selectively operable receiver means responsive to marker signals recorded on said medium at the beginning of an erasure and when said apparatus is in play back condition for automatically changing the apparatus to record condition, said receiver means also being operative in response to marker signals recorded on said medium at the termination of an erasure and when said apparatus has been previously placed in record condition in response to prior marker signals to automatically change said apparatus from record to play back condition.

13. Apparatus according to claim 12 in which said marker signals have a frequency at least as high as the upper range of recording frequencies.

References Cited in the file of this patent

UNITED STATES PATENTS

| Number | Name | Date |
|---|---|---|
| 2,336,777 | Clausen | Dec. 14, 1943 |
| 2,558,853 | Kappeler | July 3, 1951 |